June 3, 1958
A. J. BRAUN
2,837,283
MIXING VALVE
Filed Jan. 23, 1957
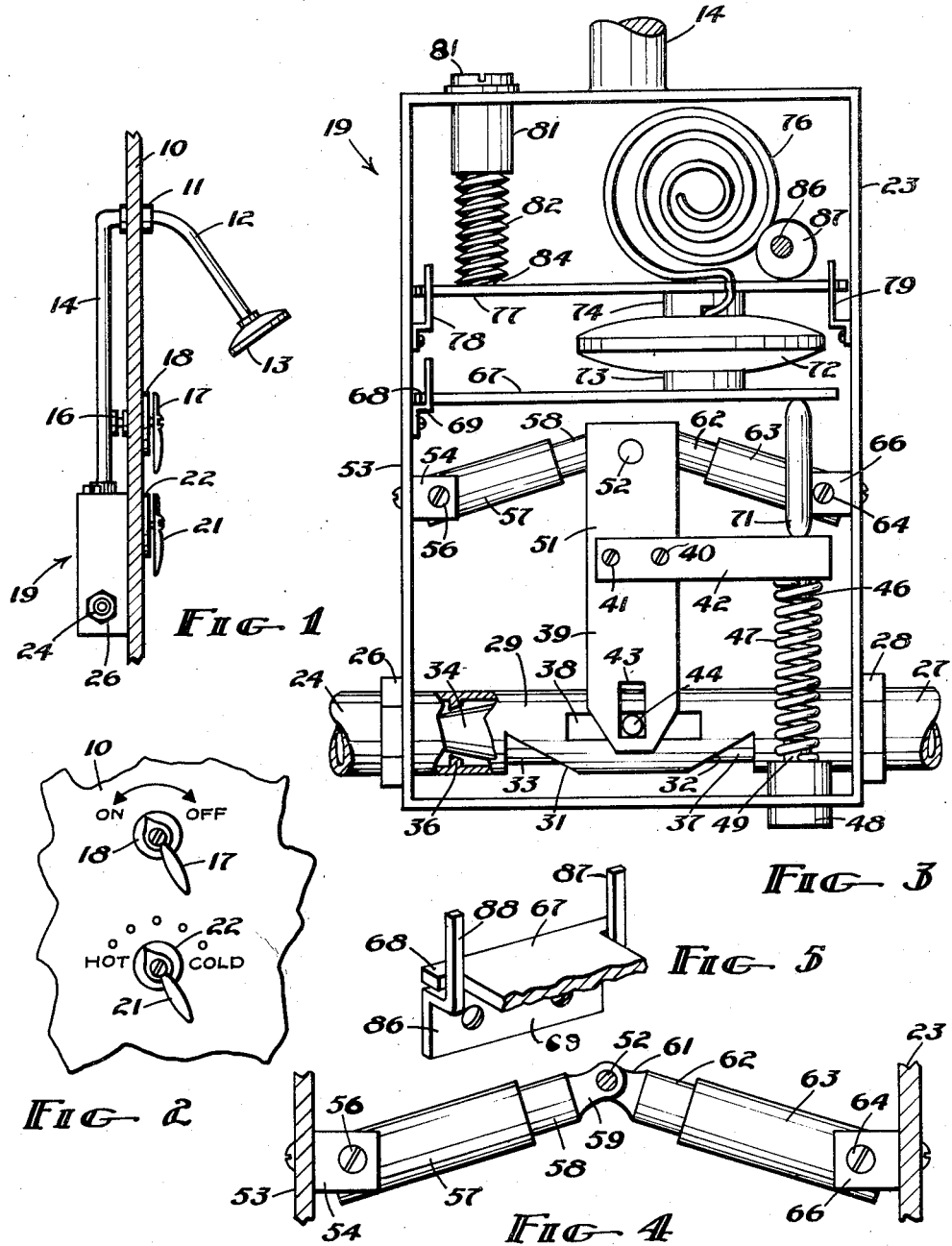
INVENTOR.
ALOYSIUS J. BRAUN
BY Morris Moody
ATTORNEY United States Patent Office 2,837,283
Patented June 3, 1958

2,837,283
MIXING VALVE
Aloysius J. Braun, Dyersville, Iowa
Application January 23, 1957, Serial No. 635,639
3 Claims. (Cl. 236—12)

This invention relates in general to mixing valves, and in particular to a non-chattering type.

It is oftentimes desirable to have a source of liquid which has a constant temperature. Therefore, it is an object of this invention to provide a mixing valve capable of furnishing fluid at any preset temperature.

Another object of the invention is to provide a mixing valve which automatically turns off the fluid if either the hot or cold supply fails to furnish fluid to it.

Still another object is to provide an improved mixing valve.

A feature of the invention is found in the provision for a mixing valve with a differential control member which regulates the input cold and hot supply in response to a temperature responsive means.

Further features, objects and advantages will become apparent from the following description and claims when read in view of the drawings, in which;

Figure 1 illustrates the mixing valve connected in a shower bath installation;

Figure 2 is a detail view of the control valves of the device shown in Figure 1;

Figure 3 is a detail view of the inside of the mixing valve with the cover removed;

Figure 4 illustrates the anti-chattering shock-absorbers for the mixing valve, and;

Figure 5 is a detail view of a slide member of the invention.

Figure 1 shows a wall 10 which has mounted therein a sleeve 11. A shower pipe 12 passes through the sleeve 11 and carries a sprayer head 13 at one end. On the inside of the wall the pipe has a downwardly extending portion 14 which is connected to a mixing valve 19. An on-off valve 16 is mounted in pipe 14 and has a handle 17 which extends and is mounted on the shower side of the wall. The handle has a pointer which may be read against indicia 18 on the wall 10. A second handle 21 controls the temperature of the fluid and may be read against the indicia 22 printed on wall 10. The handle 21 is connected to a shaft 86 and controls the temperature in a manner which will be described later.

As shown in Figure 3, the inside of the mixing valve contains the following structure. An input pipe 24 supplies hot water to the valve. Pipe 24 is connected to the valve 19 by a threaded washer 26. A cold fluid input pipe is connected to valve 19 by means of a threaded washer 28.

Pipes 24 and 27 are mounted in axial alignment with each other and are joined within the valve by a section of pipe 29. The section 29 has a pair of openings 31 and 32 formed therein. A cylindrical member 33 is formed with conical ends and is mounted within the pipe 29 for limited longitudinal movement. One end 34 of member 33 engages a valve seat 36 as shown in the cutaway portion; and the other end also engages a valve seat in the pipe 29. The valve seats are so positioned relative to the conical portions of the member 33 and the openings 31 and 32 as to form a differential valve. A portion 37 of the member 33 is visible through opening 32. A slot 38 is formed in pipe 29 and a pin 44 which is attached to member 33 extends therethrough. The member 33 may be assembled within the pipe 29 in the following fashion. One of the two valve seats may be welded in the pipe 29 before the member 33 is inserted. Then the other valve seat 36 is inserted and soldered or welded to the inside of pipe 29.

A plate 39 has a slot 43 through which pin 44 extends. Plate 39 is pivotally supported from the rear wall of the valve structure by bolt 41. A lever 42 is attached to plate 39 by means of pivot bolt 41 and a second bolt 40. The outer end of lever 42 has a pin 46 attached to its under side. A spring 47 engages the pin 46 and extends downwardly to a pin 49 mounted on a block 48 and which is attached to the wall of the valve housing.

The upper portion 51 of plate 39 is pivotally connected to a pair of non-chattering shock-absorbers as is best shown in Figure 4. The pin 52 passes through openings in extensions 59 and 61 which are connected to pistons 58 and 62. These pistons pass within the confines of cylinders 57 and 63, respectively. The cylinders 57 and 63 are pivotally supported from the side walls 23 and 53 of the valve housing from brackets 54 and 66 by pins 56 and 64.

One of the bolts 41 extends through the plate 39 and is attached to the rear of the housing to pivotally hold it. The upper portion of level 42 has an indention into which is received one end of a pin 71. The other end of pin 71 is received into an indention formed adjacent the free end of a plate 67. As best shown in the detail view of Figure 5, the other end of plate 67 rests on a bracket 69 which is attached to the side wall 53 of the housing. The bracket 69 has a bottom portion 86 and a pair of L-shaped projections 87 and 88. The plate has extensions 68 which pass behind the projections 87 and 88.

A cylindrical block 73 is welded or otherwise attached to the plate 67. A temperature responsive bellows 72 is attached to the block 73 and has a coil of tubing 76 which extends therefrom. A block 74 is attached to the upper side of the bellows 72 and engages a second plate 77 which has its opposite ends slidably supported by brackets 78 and 79 which are attached to the side walls 53 and 23, respectively.

A sleeve 81 is mounted to the top of the housing and threadedly receives a screw 82 which has a head 80. The lower end 84 of screw 82 engages plate 77.

A cam 87 is mounted on shaft 86 which is pivotally supported by the valve housing and engages the plate 77 adjacent the end opposite the screw 82. The outlet pipe 14 is attached to the top of the housing.

In operation the on-off handle 17 is turned to the "on" position. Water is retained in the valve housing at all times because the inlets connected to the hot and cold fluid are never both closed by the differential valve. Thus, when the "on-off" valve 16 is turned on fluid starts to flow. The handle 21 is turned to the desired temperature. Handle 21 controls shaft 86 which regulates cam 87. Cam 87 controls the position of plate 77 which in turn, bears on block 74 and the bellows 72. Bellows 72 rests on block 73 which engages plate 67. One end of plate 67 engages pin 71 which bears against lever 42. Thus, cam 87 adjusts the rest position of cylindrical member 33 which is the controlling member of the differential valve. The bellows 72 is temperature responsive and also controls the position of the member 33 through the linkage described.

The shock-absorbers which are attached to the upper end of plate 39 fill with fluid and prevent the valve 33 from chattering between the inlet valve seats.

The screw 82 is adjusted at the factory and is merely for calibrating the valve. It need not be adjusted in the home.

If the water becomes hotter than the preset temperature, the bellows 72 will expand causing the member to move to the left to reduce or cut off completely the fluid from pipe 24. If the water becomes too cold the bellows will contract and move the member 33 to the right to cut off the cold supply. If either supply fails due to external conditions, the valve will cut off the the other supply and no extremely hot or cold water will pass the valve.

It is seen that this invention provides a new valve. Although it has been described with respect to a preferred embodiment, it is not to be so limited as changes and modifications may be made therein which are within the intended scope as defined by the appended claims.

I claim:

1. A mixing valve for supplying fluid at a constant temperature comprising, a valve housing, a hot fluid inlet pipe connected to the housing, a cold fluid inlet pipe connected to the housing, a straight section of pipe within the housing with its opposite ends connected to the cold and hot inlet pipes, a cylindrical valve member with conical ends mounted within the straight section of pipe, a pair of valve seats in the straight section adjacent the conical ends of the valve member, a pair of outlet openings formed in the straight section, a rectangular opening formed in the straight section, a pin attached in the valve member and extending through the rectangular opening, control means connected to said pin to maintain the valve structure positioned so as to supply fluid of constant temperature, said control means comprises, a plate pivotally supported by the housing and formed with an opening through which said pin extends, a pair of shock-absorbers attached to opposite side walls of the housing and pivotally attached to the plate, a lever attached to the plate, a spring mounted between said lever and the housing, a temperature responsive means coupled to the lever, and means for moving the temperature responsive means to set the valve to a pre-set temperature.

2. A mixing valve for supplying fluid at a constant temperature comprising, a valve housing, a hot fluid inlet pipe connected to the housing, a cold fluid inlet pipe connected to the housing, a straight section of pipe within the housing with its opposite ends connected to the cold and hot inlet pipes, a cylindrical valve member with conical ends mounted within the straight section of pipe, a pair of valve seats in the straight section adjacent the conical ends of the valve member, a pair of outlet openings formed in the straight section, a rectangular opening formed in the straight section, a pin attached in the valve member and extending through the rectangular opening, control means connected to said pin to maintain the valve structure positioned so as to supply fluid of constant temperature, said control means comprises, a plate pivotally supported by the housing and formed with a slot which passes over said pin, a first shock-absorber attached to one side of the housing and pivotally connected to the plate, a second shock-absorber attached to the other side of the housing pivotally connected to the plate, a lever connected to the plate, a spring in compression mounted between the lever and the bottom of the housing, a first slidable plate attached to the housing, a pin mounted between said plate and said lever, a second slidable plate supported by the housing, a temperature responsive bellows mounted between said plates, and means for adjusting the position of the second slidable plate to determine the pre-set temperature at which fluid is to be supplied.

3. In apparatus according to claim 2 wherein said means for adjusting the position of said second slide plate comprises, a set-screw which is threadedly received through the housing and which engages the second plate, and a cam mounted on a rotatable shaft supported by the housing and in engagement with the second slidable plate.

References Cited in the file of this patent

UNITED STATES PATENTS

| | | |
|---|---|---|
| 1,476,718 | Leonard | Dec. 11, 1923 |
| 1,724,504 | Murdock | Aug. 13, 1929 |
| 1,879,344 | Lawler | Sept. 27, 1932 |
| 1,989,909 | Boydston | Feb. 5, 1935 |
| 2,708,551 | Record | May 17, 1955 |
| 2,780,412 | Holley | Feb. 5, 1957 |

FOREIGN PATENTS

| | | |
|---|---|---|
| 302,096 | Switzerland | Oct. 15, 1954 |